US012755985B2

(12) United States Patent
Hanasaki et al.

(10) Patent No.: US 12,755,985 B2
(45) Date of Patent: Oct. 6, 2026

(54) ELECTRODE BINDER FOR BIOFUEL CELL

(71) Applicant: Resonac Corporation, Tokyo (JP)

(72) Inventors: Mitsuru Hanasaki, Tokyo (JP); Ryohsuke Ikehata, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/842,848

(22) PCT Filed: Mar. 27, 2024

(86) PCT No.: PCT/JP2024/012234

§ 371 (c)(1),
(2) Date: Aug. 30, 2024

(87) PCT Pub. No.: WO2024/204335

PCT Pub. Date: Oct. 3, 2024

(65) Prior Publication Data

US 2025/0112248 A1 Apr. 3, 2025

(30) Foreign Application Priority Data

Mar. 30, 2023 (JP) ................................ 2023-055425

(51) Int. Cl.
*H01M 8/16* (2006.01)
*H01M 4/86* (2006.01)

(52) U.S. Cl.
CPC ........... *H01M 4/8668* (2013.01); *H01M 8/16* (2013.01); *H01M 2250/30* (2013.01)

(58) Field of Classification Search
None
See application file for complete search history.

(56) References Cited

U.S. PATENT DOCUMENTS

2006/0275661 A1* 12/2006 Kim ...................... H01M 4/622
429/246

FOREIGN PATENT DOCUMENTS

| | | | | |
|---|---|---|---|---|
| CN | 101140256 | A | 3/2008 | |
| CN | 102934269 | A | 2/2013 | |
| CN | 110462900 | A | 11/2019 | |
| JP | 2018-36201 | A | 3/2018 | |
| JP | 2021-140988 | A | 9/2021 | |
| JP | 6994184 | B2 | 1/2022 | |
| WO | WO-2010113940 | A1 * | 10/2010 | ........... H01M 4/623 |
| WO | 2013/065581 | A1 | 5/2013 | |
| WO | 2022/097683 | A1 | 5/2022 | |

OTHER PUBLICATIONS

WO-2010113940-A1 (Year: 2010).*

* cited by examiner

*Primary Examiner* — Tracy M Dove
(74) *Attorney, Agent, or Firm* — Sughrue Mion, PLLC

(57) ABSTRACT

Provided is an electrode binder for a biofuel cell, which can provide an electrode slurry that has a low environmental load, a conductive material of which being good in dispersibility, and is suitable for screen printing and allows production of a biofuel cell that exhibits good output characteristics. The electrode binder for a biofuel cell according to the present invention includes a polymer (A) having a first structural unit derived from a nonionic ethylenically unsaturated monomer (a1), a second structural unit derived from an anionic ethylenically unsaturated monomer (a2), and a third structural unit derived from a crosslinking agent (a3), and the crosslinking agent (a3) has two or more ethylenically unsaturated bonds in one molecule.

4 Claims, 1 Drawing Sheet

[Fig. 1]
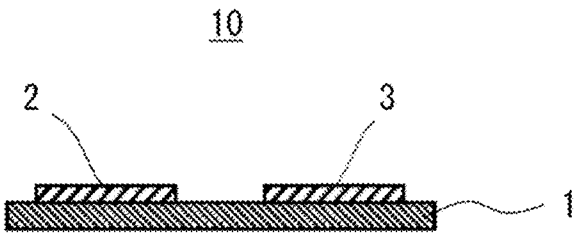
[Fig. 2]
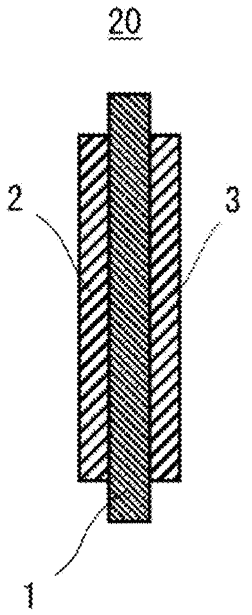
[Fig. 3]
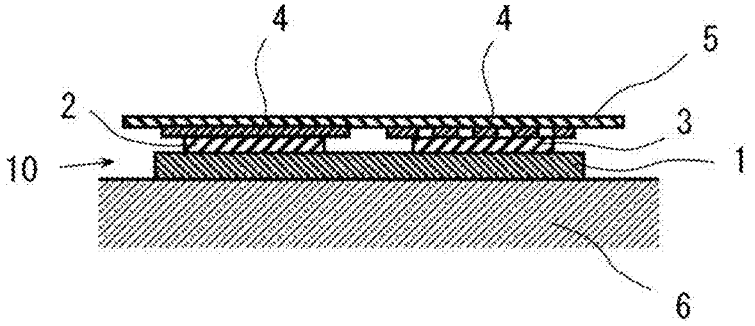

ELECTRODE BINDER FOR BIOFUEL CELL

CROSS REFERENCE TO RELATED APPLICATIONS

This application is a National Stage of International Application No. PCT/JP2024/012234 filed Mar. 27, 2024, claiming priority based on Japanese Patent Application No. 2023-055425 filed Mar. 30, 2023.

TECHNICAL FIELD

The present invention relates to an electrode binder for a biofuel cell.

BACKGROUND ART

As a next-generation fuel cell, research and development are being carried out on a biofuel cell that uses an enzyme or a microorganism as an electrode catalyst and generates electricity by using a biomass resource such as a sugar, an alcohol, or an organic waste liquid as a fuel (see, for example, Patent Literatures 1 and 2).

A biofuel cell that uses an enzyme generally generates electricity by oxidatively degrading a fuel at a negative electrode (anode) through the use of an oxidizing enzyme to extract an electron and by reducing oxygen at a positive electrode (cathode) through the use of a reducing enzyme to generate water.

One known process for producing such a biofuel cell simply and at low cost is a method involving patterning an electrode material by screen printing. Specifically, the method is generally a method for forming an electrode pattern by preparing a slurry (electrode slurry) by dispersing a conductive material such as a carbon powder in a binder (electrode binder) obtained by dissolving polyvinylidene fluoride (PVDF) in an organic solvent such as N-methylpyrrolidone (NMP), and then screen-printing the slurry on a substrate and drying the same (see, for example, Patent Literature 1).

CITATION LIST

Patent Literature

PTL1: JP 6994184 B

PTL2: JP 2021-140988 A

SUMMARY OF INVENTION

Technical Problem

However, there is a concern that the electrode binder that uses NMP, which is an organic solvent, may damage a screen printing apparatus, and the environmental load of the organic solvent is also a problem.

In addition, in the case of the electrode slurry that uses PVDF, it could not be necessarily said that the binding property of the conductive material is not necessarily sufficient. Furthermore, PVDF is highly water repellent, and the electrode slurry that uses PVDF also has problems such as insufficient immobilization of an enzyme on an electrode and easy inactivation of an enzyme, making it impossible to obtain a biofuel cell exhibiting sufficient output characteristics.

The present invention has been made in order to solve these problems, and an object thereof is to provide an electrode binder for a biofuel cell, which can provide an electrode slurry that has a low environmental load and is suitable for screen printing and allows production of a biofuel cell that exhibits good output characteristics.

Solution to Problem

The present invention is based on the finding that a predetermined polymer is suitable as an electrode binder when forming an electrode for a biofuel cell by screen printing.

The present invention provides the following means.

[1] An electrode binder for biofuel cell that comprises a polymer (A), the polymer (A) comprises a first structural unit derived from a nonionic ethylenically unsaturated monomer (a1), a second structural unit derived from an anionic ethylenically unsaturated monomer (a2), and a third structural unit derived from a crosslinking agent (a3), and the crosslinking agent (a3) has two or more ethylenically unsaturated bonds in one molecule.

[2] The electrode binder for a biofuel cell according to [1], wherein a content of the polymer (A) is 50% by mass or more.

[3] The electrode binder for a biofuel cell according to [1], wherein the anionic ethylenically unsaturated monomer (a2) comprises one or more selected from the group consisting of an ethylenically unsaturated carboxylic acid and a salt thereof, and an ethylenically unsaturated sulfonic acid and a salt thereof.

Advantageous Effects of Invention

According to the present invention, it is possible to provide an electrode binder for a biofuel cell, which can provide an electrode slurry that has a low environmental load and is suitable for screen printing and allows production of a biofuel cell that exhibits good output characteristics.

BRIEF DESCRIPTION OF DRAWINGS

FIG. 1 is a schematic cross-sectional view schematically showing an example of the configuration of a biofuel cell according to an embodiment of the present invention.

FIG. 2 is a schematic cross-sectional view schematically showing a further example of the configuration of a biofuel cell according to an embodiment of the present invention.

FIG. 3 is a schematic cross-sectional view schematically showing an example of the embodiment of the biofuel cell of FIG. 1.

DESCRIPTION OF EMBODIMENTS

The definitions and meanings of the terms and expressions used herein will be given below.

The electrode binder for a biofuel cell, the electrode binder composition for a biofuel cell, and the electrode slurry for a biofuel cell are also referred to simply as the "electrode binder," the "electrode binder composition," and the "electrode slurry," respectively.

When simply referring to an "electrode," the electrode refers to an electrode in a state before an enzyme is immobilized thereon, and is to be distinguished from an "enzyme electrode" having an enzyme immobilized thereon.

The expression "X to Y" (wherein X and Y are numerical values) means a numerical range with X being the lower limit value and Y being the upper limit value. In a numerical range (for example, a range of content or the like), each of lower limit values and each of upper limit values given stepwise may be combined independently. The lower limit value and the upper limit value of a numerical range may each be replaced with a numerical value given in an Example.

The content of each structural unit constituting the polymer is based on the proportion determined based on the blending amount of the compound from which each structural unit is derived, which is a synthetic raw material for the polymer.

"(Meth)acrylic" is a general term for acrylic and methacrylic. Similarly, "(meth)acrylate" is a general term for acrylate and methacrylate, and "(meth)acryloyl" is a general term for acryloyl and methacryloyl.

The glass transition temperature is the peak top temperature of a temperature derivative curve of differential scanning calorimetry (DSC). Specifically, the glass transition temperature is measured by the method described in the Examples.

The median diameter D50 of the particle diameter is the 50% cumulative particle diameter on a volume basis determined from a particle size distribution curve obtained by measurement of an aqueous dispersion sample by a dynamic light scattering (DLS) method.

[Electrode Binder for Biofuel Cell]

The electrode binder according to an embodiment of the present invention (hereinafter referred to as the present embodiment) includes a polymer (A) having a first structural unit derived from a nonionic ethylenically unsaturated monomer (a1), a second structural unit derived from an anionic ethylenically unsaturated monomer (a2), and a third structural unit derived from a crosslinking agent (a3), and the crosslinking agent (a3) has two or more ethylenically unsaturated bonds in one molecule.

An electrode binder including a polymer (A) having such a predetermined structure can provide an electrode slurry that has a low environmental load and has good dispersibility of a conductive material and is suitable for screen printing, and by using this electrode slurry, a biofuel cell that has a low environmental load, is low cost, and exhibits good output characteristics can be produced.

The electrode binder according to the present embodiment includes the polymer (A), and may further include a water-soluble cellulose derivative (B) and a further additive described later.

The content of the polymer (A) in the electrode binder is preferably 50% by mass or more in order to ensure that the effects of the present invention are sufficiently exhibited. The content thereof is more preferably 60% by mass or more, and further preferably 80% by mass or more, and may be 100% by mass.

(Polymer (A))

The polymer (A) has a first structural unit derived from a nonionic ethylenically unsaturated monomer (a1), a second structural unit derived from an anionic ethylenically unsaturated monomer (a2), and a third structural unit derived from a crosslinking agent (a3).

The polymer (A) may have a further structural unit in addition to the first structural unit, the second structural unit, and the third structural unit. In order to ensure that the effects of the present invention are sufficiently exhibited, the total content of the first structural unit, the second structural unit, and the third structural unit is preferably 80 to 100% by mass, more preferably 85% by mass or more, further preferably 90% by mass or more, and more further preferably 95% by mass or more, per 100% by mass of all structural units constituting the polymer (A).

<First Structural Unit>

The first structural unit constituting the polymer (A) is derived from a nonionic ethylenically unsaturated monomer (a1).

The content of the first structural unit in the total amount of the first structural unit, the second structural unit, and the third structural unit that constitute the polymer (A) is preferably 60 to 98% by mass, in order to obtain a polymer (A) by which the effects of the present invention are sufficiently exhibited. The content thereof is more preferably 75% by mass or more, and further preferably 90% by mass or more, and is more preferably 97% by mass or less, and further preferably 96% by mass or less.

The nonionic ethylenically unsaturated monomer (a1) from which the first structural unit is derived has one ethylenically unsaturated bond in one molecule and has neither an anionic functional group nor a cationic functional group. One nonionic ethylenically unsaturated monomer (a1) may be used alone, or two or more may be used in combination.

As the nonionic ethylenically unsaturated monomer (a1), one or more selected from the group consisting of an aromatic ethylenically unsaturated compound, a (meth)acrylic acid alkyl ester, and a polar group-containing ethylenically unsaturated carboxylic acid ester are suitably used, and all of these are preferably included.

The aromatic ethylenically unsaturated compound contributes to a good binding property of a conductive material and the like.

Examples of the aromatic ethylenically unsaturated compound include styrene, tert-butylstyrene, α-methylstyrene, p-methylstyrene, 1,1-diphenylethylene, and benzyl (meth)acrylate. One aromatic ethylenically unsaturated compound may be used alone, or two or more may be used in combination. Among these, an aromatic vinyl compound is preferable, and styrene is more preferable.

The proportion of the aromatic ethylenically unsaturated compound in the nonionic ethylenically unsaturated monomer (a1) is preferably 25 to 70% by mass from the viewpoints of the binding property of the conductive material, the close adhesion thereof to the substrate, and the like. The proportion thereof is more preferably 35% by mass or more, and further preferably 45% by mass or more, and is more preferably 65% by mass or less, and further preferably 60% by mass or less.

The (meth)acrylic acid alkyl ester contributes to the ease of synthesis and the durability of the polymer (A).

Examples of the (meth)acrylic acid alkyl ester include methyl (meth)acrylate, ethyl (meth)acrylate, (meth)acrylic acid-n-propyl, isopropyl (meth)acrylate, (meth)acrylic acid-n-butyl, (meth)acrylic acid-tert-butyl, cyclohexyl (meth)acrylate, (meth)acrylic acid-2-ethylhexyl, isobornyl (meth)acrylate, lauryl (meth)acrylate, and stearyl (meth)acrylate. One (meth)acrylic acid alkyl ester may be used alone, or two or more may be used in combination. Among these, (meth)acrylic acid-n-propyl, isopropyl (meth)acrylate, (meth)acrylic acid-n-butyl, (meth)acrylic acid-tert-butyl, cyclohexyl (meth)acrylate, and (meth)acrylic acid-2-ethylhexyl are preferable, and acrylic acid-2-ethylhexyl is more preferable.

In the (meth)acrylic acid alkyl ester, the alkyl group bonded to the (meth)acryloyloxy group preferably has 2 to 9 carbon atoms, and more preferably 4 to 9 carbon atoms, and an alkyl group having 4 to 9 carbon atoms is further preferably bonded to the acryloyloxy group, from the viewpoint of good flexibility of the electrode binder.

The proportion of the (meth)acrylic acid alkyl ester in the nonionic ethylenically unsaturated monomer (a1) is preferably 20 to 70% by mass from the viewpoints of the flexibility of the electrode binder, the binding property of the conductive material, the close adhesion thereof to the substrate, and the like. The proportion thereof is more preferably 30% by mass or more, and further preferably 40% by mass or more, and is more preferably 60% by mass or less, and further preferably 50% by mass or less.

The polar group-containing ethylenically unsaturated carboxylic acid ester contributes to good polymerizability during synthesis of the polymer (A), the mechanical stability of the electrode binder, and the like.

Examples of the polar group of the polar group-containing ethylenically unsaturated carboxylic acid ester include a hydroxy group and a cyano group.

Examples of the polar group-containing ethylenically unsaturated carboxylic acid ester include (meth)acrylic acid-2-hydroxyethyl, acrylic acid-2-hydroxypropyl, and (meth) acrylonitrile. One polar group-containing ethylenically unsaturated carboxylic acid ester may be used alone, or two or more may be used in combination. Among these, (meth) acrylic acid-2-hydroxyethyl is preferable, and methacrylic acid-2-hydroxyethyl is more preferable.

The proportion of the polar group-containing ethylenically unsaturated carboxylic acid ester in the nonionic ethylenically unsaturated monomer (a1) is preferably 0.50 to 20% by mass from the viewpoints of good polymerizability during synthesis of the polymer (A), the binding property of the conductive material, the close adhesion thereof to the substrate, and the swelling resistance of the electrode binder during use of the cell, and the like. The proportion thereof is more preferably 1.0% by mass or more, and further preferably 2.0% by mass or more, and is more preferably 15% by mass or less, and further preferably 10% by mass or less.

<Second Structural Unit>

The second structural unit constituting the polymer (A) is derived from an anionic ethylenically unsaturated monomer (a2).

The content of the second structural unit in the total amount of the first structural unit, the second structural unit, and the third structural unit that constitute the polymer (A) is preferably 1.5 to 20% by mass, and is more preferably 3.0% by mass or more, and further preferably 4.5% by mass or more, and is more preferably 15% by mass or less, and further preferably 10% by mass or less, in order to obtain a polymer (A) by which the effects of the present invention are sufficiently exhibited.

The anionic ethylenically unsaturated monomer (a2) from which the second structural unit is derived has one ethylenically unsaturated bond in one molecule and has an anionic functional group. One anionic ethylenically unsaturated monomer (a2) may be used alone, or two or more may be used in combination.

Examples of the anionic functional group include a carboxy group, a sulfo group, and a phosphate group. The anionic functional group may form a salt.

As the anionic ethylenically unsaturated monomer (a2), one or more selected from the group consisting of an ethylenically unsaturated carboxylic acid and a salt thereof, and an ethylenically unsaturated sulfonic acid and a salt thereof are suitably used, and all of these are more preferably included.

Examples of the ethylenically unsaturated carboxylic acid and a salt thereof include an unsaturated monocarboxylic acid such as (meth)acrylic acid or crotonic acid; an unsaturated dicarboxylic acid such as maleic acid, fumaric acid, or itaconic acid; a half ester of an unsaturated dicarboxylic acid, and salts thereof. One ethylenically unsaturated carboxylic acid and salt thereof may be used alone, or two or more may be used in combination. Among these, (meth) acrylic acid and itaconic acid are preferable.

The content of the ethylenically unsaturated carboxylic acid and salt thereof in the anionic ethylenically unsaturated monomer (a2) is preferably 70 to 99% by mass from the viewpoints of good polymerizability during synthesis of the polymer (A), the binding property of the conductive material, the close adhesion thereof to the substrate, and the like. The proportion thereof is more preferably 80% by mass or more, and further preferably 85% by mass or more, and is more preferably 98% by mass or less, and further preferably 95% by mass or less.

Examples of the ethylenically unsaturated sulfonic acid and salt thereof include p-styrenesulfonic acid and a salt thereof. One ethylenically unsaturated sulfonic acid may be used alone, or two or more may be used in combination. Among these, sodium p-styrenesulfonate is preferable.

The proportion of the ethylenically unsaturated sulfonic acid and salt thereof in the anionic ethylenically unsaturated monomer (a2) is preferably 1.0 to 30% by mass from the viewpoints of good polymerizability during synthesis of the polymer (A), the binding property of the conductive material, the close adhesion thereof to the substrate, and the like. The proportion thereof is more preferably 2.0% by mass or more, and further preferably 3.0% by mass or more, and is more preferably 20% by mass or less, and further preferably 15% by mass or less.

<Third Structural Unit>

The third structural unit constituting the polymer (A) is derived from a crosslinking agent (a3).

The content of the third structural unit in the total amount of the first structural unit, the second structural unit, and the third structural unit that constitute the polymer (A) is preferably 0.010 to 0.50% by mass, and is more preferably 0.020% by mass or more, and further preferably 0.030% by mass or more, and is more preferably 0.30% by mass or less, and further preferably 0.10% by mass or less, from the viewpoints of the swelling resistance of the electrode binder during use of the cell, and the like.

The crosslinking agent (a3) from which the third structural unit is derived has two or more ethylenically unsaturated bonds in one molecule. One crosslinking agent (a3) may be used alone, or two or more may be used in combination.

The crosslinking agent (a3) can form a crosslinked structure, for example, by addition reaction of two or more ethylenically unsaturated bonds with ethylenically unsaturated bonds contained in a further synthetic raw material compound for the polymer (A). That is, the polymer (A) is a crosslinked polymer.

Examples of the crosslinking agent (a3) include divinylbenzene, ethylene glycol di(meth)acrylate, 1,6-hexanediol di(meth)acrylate, and 2-hydroxy-3-acryloyloxypropyl methacrylate. Among these, divinylbenzene is preferable.

<Glass Transition Temperature>

The glass transition temperature of the polymer (A) is preferably from −30 to 100° C. from the viewpoints of the binding property of the conductive material, the close adhesion thereof to the substrate, good flexibility of the electrode binder, and the like. The glass transition temperature thereof is more preferably −20° C. or more, and further preferably −10° C. or more, and is more preferably 90° C. or less, and further preferably 80° C. or less.

<Particle Diameter>

The polymer (A) is present as a dispersed particle in an electrode binder composition including an aqueous dispersion medium. The suitable particle diameter of the dispersed particle varies depending on the form and the particle size of the conductive material, and the like. In order to ensure that the effects of the present invention are sufficiently exhibited, the median diameter D50 of the particle in the aqueous dispersion is preferably 0.10 to 1.0 μm. The median diameter D50 thereof is more preferably 0.15 μm or more, and further preferably 0.20 μm or more, and is more preferably 0.80 μm or less, and further preferably 0.50 μm or less.

<Synthesis Method>

The polymer (A) can be produced by polymerizing synthetic raw materials including a nonionic ethylenically unsaturated monomer (a1), an anionic ethylenically unsaturated monomer (a2), and a crosslinking agent (a3). The polymerization method is not particularly limited, and a suitable example thereof is emulsion polymerization.

The emulsion polymerization is carried out in an aqueous medium in the presence of a polymerization initiator, and, if necessary, by adding a surfactant and a further additive. The method therefor may be a method for feeding the synthetic raw materials all at once or a method for sequentially supplying these by dropwise addition or the like. The reaction is usually carried out at 30 to 90° C. with stirring.

From the viewpoints of the stability of the polymer (A) in the reaction system and the like, it is preferable to add a basic substance during or after the polymerization reaction, if necessary, to cause neutralization and adjust the pH.

Preferable examples of the basic substance include ammonia, triethylamine, ethanolamine, morpholine, 2-amino-2-methyl-1-propanol, lithium hydroxide, sodium hydroxide, potassium hydroxide, and calcium hydroxide. One basic substance may be used alone or two or more may be used in combination.

The aqueous medium is water, a hydrophilic solvent, or a mixture thereof. Examples of the hydrophilic solvent include methanol, ethanol, isopropyl alcohol, N-methylpyrrolidone (NMP), and 1,3-butylene glycol.

The aqueous medium is preferably water from the viewpoints of the dispersion stability of the synthetic raw materials and the polymer, the reduction of the environmental load, and the like. A mixture of water and a hydrophilic solvent is also preferable as long as the dispersion stability is not impaired.

The aqueous medium used in the synthesis of the polymer (A) may remain as it is even after the synthesis as the aqueous medium constituting the electrode binder composition.

The amount of the aqueous medium used is appropriately adjusted depending on the dispersibility of the synthetic raw materials in the aqueous medium, the viscosity of the reaction system, and the like. The amount of the aqueous medium used is preferably 50 to 300 parts by mass per 100 parts by mass in total of the nonionic ethylenically unsaturated monomer (a1), the anionic ethylenically unsaturated monomer (a2), and the crosslinking agent (a3), from the viewpoint of the appropriate progress of the polymerization reaction. The amount thereof is more preferably 80 parts by mass or more, and further preferably 100 parts by mass or more, and is more preferably 250 parts by mass or less, and further preferably 200 parts by mass or less.

The polymerization initiator is not particularly limited, and a radical polymerization initiator can be used, and examples thereof include a peroxide such as ammonium persulfate, potassium persulfate, hydrogen peroxide, or tert-butylhydroperoxide. One polymerization initiator may be used alone, or two or more may be used in combination. In addition, redox polymerization that uses these polymerization initiators in combination with a reducing agent such as sodium bisulfite, Rongalite, or ascorbic acid may be carried out.

From the viewpoints of the dispersion stability of the synthetic raw materials and the produced polymer (A) in the aqueous medium and the like, the surfactant suitably used is at least one or more selected from the group consisting of a nonionic surfactant and an anionic surfactant.

Examples of the nonionic surfactant include a polyoxyethylene alkyl ether, a polyoxyethylene alkyl phenyl ether, a polyoxyethylene polycyclic phenyl ether, a polyoxyalkylene alkyl ether, a sorbitan fatty acid ester, and a polyoxyethylene sorbitan fatty acid ester. One nonionic surfactant may be used alone, or two or more may be used in combination.

Examples of the anionic surfactant include an alkylbenzenesulfonate, an alkyl sulfate, a polyoxyethylene alkyl ether sulfate, and a fatty acid salt.

As the anionic surfactant, a reactive surfactant having an ethylenically unsaturated bond is also suitably used.

Examples of the reactive surfactant include compounds represented by the following formulas (1) to (4). One reactive surfactant may be used alone, or two or more may be used in combination. Among these, the compound represented by formula (4) is preferable, and sodium alkyl allyl sulfosuccinate is more preferable.

(1)

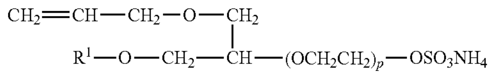

wherein $R^1$ is an alkyl group, and p is an integer of 10 to 40. $R^1$ is preferably an alkyl group having 10 to 40 carbon atoms, and more preferably a linear alkyl group having 10 to 40 carbon atoms.

(2)

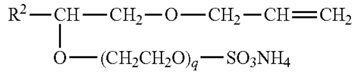

wherein $R^2$ is an alkyl group, and q is an integer of 10 to 12. $R^2$ is preferably an alkyl group having 10 to 40 carbon atoms, and more preferably a linear alkyl group having 10 to 40 carbon atoms.

(3)

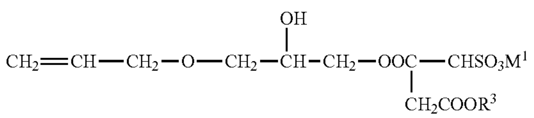

wherein $R^3$ is an alkyl group, and $M^1$ is $NH_4$ or Na. $R^3$ is preferably an alkyl group having 10 to 40 carbon atoms, and more preferably a linear alkyl group having 10 to 40 carbon atoms.

(4)

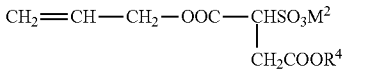

wherein $R^4$ is an alkyl group, and $M^2$ is $NH_4$ or Na. $R^4$ is preferably an alkyl group having 10 to 40 carbon atoms, and more preferably a linear alkyl group having 10 to 40 carbon atoms.

The reactive surfactant exerts an emulsifying action on the reaction system in emulsion polymerization and has copolymerizability with the nonionic ethylenically unsaturated monomer (a1), the anionic ethylenically unsaturated monomer (a2), and the crosslinking agent (a3), and in the present embodiment, the reactive surfactant is not regarded as a structural unit constituting the polymer (A).

The amount of the surfactant added is preferably 0.050 to 1.2 parts by mass per 100 parts by mass in total of the nonionic ethylenically unsaturated monomer (a1), the anionic ethylenically unsaturated monomer (a2), and the crosslinking agent (a3), from the viewpoints of stable progress of the polymerization reaction, the dispersion stability of the synthetic raw materials and the produced polymer (A) in the aqueous medium, the close adhesion of the conductive material to the substrate, and the like. The amount thereof is more preferably 0.10 parts by mass or more, and further preferably 0.15 parts by mass or more, and is more preferably 1.0 parts by mass or less, and further preferably 0.50 parts by mass or less.

Examples of the further additive include a chain transfer agent such as thiol, thiol glycolic acid and an ester thereof, or 3-mercaptopropionic acid and an ester thereof.

The addition of the further additive is optional, and this may be added as long as a polymer (A) that does not hinder the effects of the present invention can be obtained.

(Water-Soluble Cellulose Derivative (B))

The electrode binder according to the present embodiment includes the polymer (A) and also preferably includes a water-soluble cellulose derivative (B).

The water-soluble cellulose derivative (B) exerts the action of facilitating the dispersion of the conductive material in the electrode slurry.

Examples of the water-soluble cellulose derivative (B) include a cellulose such as methylcellulose, carboxymethylcellulose, hydroxyethylcellulose, or hydroxypropylcellulose, and a salt thereof; polyvinyl alcohol; and polyvinylpyrrolidone. Examples of the salt of a cellulose include an ammonium salt and an alkali metal salt. One water-soluble cellulose derivative (B) may be used alone, or two or more may be used in combination. Among these, carboxymethylcellulose and a salt thereof are preferable.

When the water-soluble cellulose derivative (B) is included in the electrode binder, the content thereof is preferably 1 to 50% by mass from the viewpoint of obtaining good dispersibility of the conductive material without hindering the work of the polymer (A). The content thereof is more preferably 5% by mass or more, and further preferably 10% by mass or more, and is more preferably 40% by mass or less, and further preferably 30% by mass or less.

The total content of the polymer (A) and the water-soluble cellulose derivative (B) in the electrode binder is preferably 80% by mass or more, and more preferably 95% by mass or more, and may be 100% by mass.

[Electrode Binder Composition for Biofuel Cell]

The electrode binder composition according to the present embodiment includes the electrode binder according to the present embodiment described above and an aqueous medium, and the polymer (A) is dispersed in the aqueous medium.

The electrode binder composition can be produced by mixing the electrode binder and an aqueous medium. The mixing method is not particularly limited.

Examples of the aqueous medium in the electrode binder composition include the same aqueous media as used in the synthesis method of polymer (A) described above, and the aqueous medium may be the same as or different from that used in the synthesis method of polymer (A). The aqueous medium used in the synthesis of the polymer (A) remaining as it is even after the synthesis may be included.

The aqueous medium is preferably water from the viewpoints of the dispersion stability of the electrode binder in the electrode binder composition, the reduction of the environmental load, and the like. A mixture of water and a hydrophilic solvent is also preferable as long as the dispersion stability is not impaired.

The content of the polymer (A) in the electrode binder composition can be appropriately adjusted by optionally adding an aqueous medium during production of the electrode slurry, and from the viewpoints of easy-to-handle viscosity, the dispersion stability of the polymer (A), and the like, the content thereof is preferably 10 to 80% by mass, and is more preferably 15% by mass or more, and further preferably 20% by mass or more, and is more preferably 70% by mass or less, and further preferably 60% by mass or less.

[Electrode Slurry for Biofuel Cell]

The electrode slurry according to the present embodiment includes the electrode binder according to the present embodiment described above, a conductive material, and an aqueous medium.

The electrode slurry can be produced by mixing the electrode binder, a conductive material, and an aqueous medium. The mixing method is not particularly limited, and it is preferable to knead these by using, for example, a rotary and revolutionary stirrer in order to disperse the conductive material sufficiently and homogeneously.

The electrode slurry may include a further component as long as the effects of the present invention are not hindered, in addition to the electrode binder, the conductive material, and the aqueous medium. From the viewpoints of dispersion stability and the like, examples of the further component include a surfactant.

The total content of the electrode binder, the conductive material, and the aqueous medium in the electrode slurry is preferably 50% by mass or more in order to ensure that the effects of the present invention are sufficiently exhibited. The total content thereof is more preferably 60% by mass or more, and further preferably 80% by mass or more, and may be 100% by mass.

The aqueous medium in the electrode slurry is as described for the aqueous medium in the electrode binder composition described above.

Examples of the conductive material include a carbon material and a metal material. Examples of the carbon material include graphite, carbon black, and a porous carbon. One conductive material may be used alone, or two or more may be used in combination. Among these, a carbon material is preferable, and a porous carbon is more preferable, from the viewpoints of handleability, enzyme immobilization, and the like.

Examples of the porous carbon include mesoporous carbon, and specific examples thereof include Ketjen black, a carbon nanotube, graphene, and a mesoporous carbon produced by a template method, such as MgO templated carbon. Among these, MgO templated carbon is suitably used from the viewpoint of good immobilization of the enzyme.

The content of the conductive material in the electrode slurry is preferably 40 to 85% by mass from the viewpoint of closely adhering a sufficient amount of the conductive material to the substrate. The content thereof is more preferably 45% by mass or more, and further preferably 50% by mass or more, and is more preferably 80% by mass or less, and further preferably 75% by mass or less.

The content of the electrode binder in the electrode slurry is preferably 10 to 200 parts by mass, per 100 parts by mass of the conductive material, as a sufficient amount for closely adhering the conductive material to the substrate. The content thereof is more preferably 20 parts by mass or more, and further preferably 30 parts by mass or more, and is more preferably 150 parts by mass or less, further preferably 120 parts by mass or less, and more further preferably 60 parts by mass or less.

The total content of the electrode binder and the conductive material in the electrode slurry is preferably 40 to 80% by mass from the viewpoints of the applicability of the electrode slurry to screen printing, the reduction of the amount thereof used, and the like. The total content thereof is more preferably 45% by mass or more, and further preferably 50% by mass or more, and is more preferably 75% by mass or less, and further preferably 70% by mass or less.

[Electrode for Biofuel Cell]

The electrode binder according to the present embodiment is preferably included in at least one of an anode and a cathode as the electrodes for a biofuel cell. The electrode binder according to the present embodiment is more preferably included in each of both the anode and the cathode, and in this case, the electrode binder included in the anode and the electrode binder included in the cathode may have the same composition or different compositions.

The electrode includes a conductive material and an electrode binder. The electrode binder is preferably the electrode binder according to the present embodiment.

The electrode preferably has at least a conductive material and an electrode binder adhered to a substrate. Such an electrode can be produced by applying an electrode slurry to a substrate and drying the applied slurry. The electrode slurry is preferably the electrode slurry according to the present embodiment.

Examples of the substrate include an inorganic material such as paper, a cloth, a resin film, a metal material, and a ceramic. The substrate is preferably porous and has good close adhesion to the electrode binder, in order to closely adhere the conductive material at a high density. From the viewpoint of consideration of the environmental load when the biofuel cell is disposed of, for example, Japanese paper or the like is suitably used. In addition, from the viewpoint of durability, for example, oil resistant and water resistant paper is suitably used. The electrode slurry may be applied to one or both sides of the substrate.

The method for applying the electrode slurry is not particularly limited. Examples of the method for applying the electrode slurry include screen printing, a reverse roll method, a direct roll method, and a doctor blade method. Among these, screen printing is preferable because screen printing allows simple and efficient pattern formation. In the case of screen printing, for example, it is also possible to form an electrode pattern in which a lead portion and a plurality of electrodes that use a conductive material such as a carbon paste are printed on a substrate.

The electrode slurry applied to the substrate is dried to sufficiently remove the aqueous medium in the electrode slurry. The drying method is not particularly limited as long as the aqueous medium is sufficiently removed. Examples of the drying method include a method carried out under a condition such as hot air, low-temperature air, reduced pressure or vacuum, or (far) infrared radiation. These drying conditions may be combined.

[Enzyme Electrode]

The enzyme electrode according to the present embodiment is the electrode having an enzyme immobilized thereon.

In the case of an enzyme electrode for an anode, an enzyme that promotes the oxidation of the fuel in a biofuel cell is used. In addition, the enzyme may also be used in combination with an enzyme that facilitates the oxidation of the fuel by hydrolysis or the like.

When the fuel is glucose, examples of the enzyme used in the enzyme electrode for an anode include glucose oxidase, and a combination of glucose oxidase and glucose dehydrogenase. When the fuel is fructose, examples of the enzyme include fructose oxidase, and a combination of fructose oxidase and fructose dehydrogenase. When the fuel is sucrose, examples of the enzyme include invertase, and a combination of invertase and glucose dehydrogenase. When the fuel is starch, examples of the enzyme include amylase, and a combination of amylase and glucose dehydrogenase. When the fuel is lactic acid, examples of the enzyme include lactate oxidase.

In the case of an enzyme electrode for a cathode, an enzyme that promotes the reduction of oxygen is suitably used.

Examples of the enzyme used in the enzyme electrode for a cathode include bilirubin oxidase and laccase.

The enzyme electrode can be produced, for example, by immobilizing an enzyme on an electrode. In addition, the enzyme electrode can also be produced by mixing an enzyme with an electrode slurry, applying the resulting enzyme-containing electrode slurry to a substrate, and drying the applied slurry.

The method for immobilizing an enzyme on an electrode is not particularly limited, and for example, the immobilization can be carried out by applying a solution of an enzyme to an electrode and drying the applied solution. The enzyme application can be carried out, for example, by dropwise application of a solution of an enzyme, impregnation therewith, or the like. An enzyme may be applied after a mediator is applied.

The mediator is an oxidation-reduction compound that mediates electron transfer between an electrode and an enzyme, and is appropriately selected depending on the type of the fuel and the enzyme. The mediator is used by being supported on an electrode or dissolved in an electrolytic solution.

When a mediator is supported on an electrode, the mediator may be added to an electrode slurry to apply the resulting electrode slurry to the electrode, or the mediator may be applied after electrode formation. The mediator may be supported on one of an anode and a cathode, or on the both.

Examples of the mediator include an organic sulfur compound such as thionine, thionine acetate, tetrathiafulvalene, or 2,2'-azinobis(3-ethylbenzothiazoline-6-sulfonic acid ammonium); a quinone compound such as hydroquinone, 1,2-naphthoquinone, or 1,4-naphthoquinone; ferrocene; a ferricyanide; an osmium complex; and polymers obtained by modifying these compounds. One mediator may be used alone, or two or more may be used in combination.

From the viewpoint of sufficiently promoting generation of electricity, the amount of the enzyme immobilized on the electrode is preferably 0.001 $U/cm^2$ or more, more preferably 0.01 $U/cm^2$ or more, and further preferably 0.1 $U/cm^2$ or more, based on the electrode. The amount of the enzyme immobilized on the electrode is preferably as large as possible, and may be, for example, 2000 $U/cm^2$ or less, 1000 $U/cm^2$ or less, or 500 $U/cm^2$ or less.

[Biofuel Cell]

The biofuel cell according to the present embodiment generates electricity by an oxidation-reduction reaction catalyzed by an enzyme, and the enzyme is immobilized on at least one of an anode and a cathode.

One of the anode or the cathode may be or the both may each be an electrode having an enzyme immobilized thereon. The electrode having an enzyme immobilized thereon is preferably the enzyme electrode according to the present embodiment described above. Only one of the anode and the cathode may be the enzyme electrode according to the present embodiment, or the both may each be the enzyme electrode according to the present embodiment.

When both the anode and the cathode are each the enzyme electrode according to the present embodiment, the substrate of the enzyme electrode, the electrode binder, and the conductive material may each be the same or different between the anode and the cathode.

When the cathode is not the enzyme electrode according to the present embodiment, the cathode may be, for example, one on which an oxygen reduction catalyst including a metal such as platinum or the like is immobilized instead of an enzyme.

The fuel in a biofuel cell is not particularly limited as long as the fuel is a substance whose oxidation is promoted by an enzyme. Examples of the fuel include a sugar, an alcohol, an aldehyde, an amino acid, an amine, lactic acid, and uric acid. The fuel may be one that is enzymatically hydrolyzed and then oxidized (for example, starch or cellulose that hydrolyzes to glucose). One fuel may be used alone, or two or more may be used in combination. Among these, a sugar is preferable from the viewpoints of output stability, ease of handling, and the like. The type of the sugar is not particularly limited, and examples thereof include a monosaccharide, a disaccharide, an oligosaccharide, a polysaccharide, and a sugar alcohol. For example, glucose is suitably used.

An example of the structure of the biofuel cell according to the present embodiment is schematically shown in FIG. 1. A biofuel cell 10 shown in FIG. 1 has an anode 2 and a cathode 3 formed on the same surface on one side of a substrate 1 containing a fuel.

In addition, a further example of the structure of the biofuel cell according to the present embodiment is schematically shown in FIG. 2. A biofuel cell 20 shown in FIG. 2 has an anode 2 formed on one side of a substrate 1 having a fuel, and a cathode 3 formed on the other (opposite) side. In this case, the substrate 1 also has the role of a separator between the anode 2 and the cathode 3.

The biofuel cell according to the present embodiment can generate electricity only by supplying gum syrup or the like as a fuel. In addition, in a further embodiment, for example, by causing a sugar as a fuel to be contained in the substrate in advance, electricity can also be generated by using water.

In addition, further embodiments include a form in which the biofuel cell is attached to the skin before use, for example, as shown in FIG. 3. In the example of FIG. 3, a biofuel cell 10 having the form as shown in FIG. 1 is used, and a lead portion 4 is formed on each of an anode 2 and a cathode 3. The lead portion 4 is covered with a cover sheet 5, and the biofuel cell 10 is fixed to a skin 6 in such a manner that a substrate 1 is in contact with the skin 6. The biofuel cell 10 may be fixed to the skin 6 by using a pressure sensitive adhesive sheet as the cover sheet 5 to attach the biofuel cell 10 to the skin 6, or by using a separate pressure sensitive adhesive tape or the like to attach the biofuel cell 10 to the skin 6.

In the embodiment shown in FIG. 3, for example, an enzyme electrode on which lactate oxidase is immobilized can be used as the anode 2, and an enzyme electrode on which bilirubin oxidase is immobilized can be used as the cathode 3. In this case, sweat secreted from the skin 6 is absorbed by the substrate 1, and electricity is generated by using lactic acid included in the sweat as a fuel. Electric power can be taken out to the outside through the lead portion 4.

As described above, when the biofuel cell according to the present embodiment is applied to a living body, the biofuel cell can also be applied as a biosensor. For example, the biofuel cell is expected to have an application as a wearable device such as an application in which the biofuel cell is attached to an adherend such as skin, clothing, or a diaper, the amount of substance in a bodily fluid such as sweat, urine, blood, a tear, or saliva supplied from the adherend is detected as electric power, and a fluctuation or the like therein is measured to be used for health management and measurement and management of the amount of exercise.

EXAMPLES

Hereinafter, the present invention will be specifically described based on Examples. The present invention is not limited to the following Examples, and can be modified in various ways within the scope of the present invention.

[Production of Polymer (A)]

In the following Synthesis Examples, the methods for measuring various physical properties are as follows.

<Glass Transition Temperature>

Differential scanning calorimetry (DSC) was measured by using a differential scanning calorimeter ("EXSTAR DSC7020", manufactured by Hitachi High-Tech Science Corporation; temperature rise rate of 10° C./min, nitrogen gas atmosphere), and the peak top temperature of the temperature derivative curve of DSC was taken as the glass transition temperature.

<Median Diameter D50>

The median diameter D50 was determined from a particle size distribution curve obtained by measurement by a dynamic light scattering (DLS) method.

Synthesis Example 1

A reaction vessel equipped with a condenser, a thermometer, a stirrer, and a dropping funnel was charged with 60 parts by mass of ion exchanged water, and the temperature was raised to 75° C. To this reaction vessel, a mixed liquid including a total of 100 parts by mass of the nonionic ethylenically unsaturated monomer (a1), the anionic ethylenically unsaturated monomer (a2), and the crosslinking agent (a3), 0.20 parts by mass of ELEMINOL JS-20 (excluding solvent), 0.20 parts by mass of HITENOL 08E, and 80 parts by mass of ion exchanged water in the blending formulation shown in Table 1 was added dropwise over 3 hours, and stirred and mixed. At the same time, a solution of 0.40 parts by mass of potassium persulfate dissolved in 10 parts by mass of ion exchanged water was added dropwise over 3 hours, and the resulting mixture was stirred and mixed and polymerized.

Two hours after the completion of the dropwise addition, the reaction product was neutralized with 0.90 parts by mass of aqueous ammonia having a concentration of 25% by mass to obtain a dispersion of the polymer (A1) (content of polymer (A1): 40% by mass).

TABLE 1

| Blending formulation [parts by mass] | |
|---|---|
| Nonionic ethylenically unsaturated monomer (a1) | |
| Styrene | 49.23 |
| Acrylic acid-2-ethylhexyl | 43.21 |
| Methacrylic acid-2-hydroxyethyl | 1.93 |
| Methyl methacrylate | 0.05 |
| Anionic ethylenically unsaturated monomer (a2) | |
| Acrylic acid | 3.03 |
| Itaconic acid | 1.93 |
| Sodium p-styrenesulfonate | 0.58 |
| Internal crosslinking agent (a3) | |
| Divinylbenzene | 0.04 |
| Total {(a1) + (a2) + (a3)} | 100 |
| Surfactant | |
| ELEMINOL JS-20 | 0.2 |
| HITENOL 08E | 0.2 |
| Ion exchanged water | 150 |

Details of the surfactants in Table 1 are as follows.

ELEMINOL JS-20: Sodium alkyl allyl sulfosuccinate; "ELEMINOL (registered trademark) JS-20" manufactured by Sanyo Chemical Industries, Ltd.; anionic reactive surfactant; nonvolatile content of 38.5% by mass HITENOL 08E: Ammonium polyoxyethylene oleyl cetyl ether sulfate; "HITENOL (registered trademark) 08E" manufactured by DKS Co., Ltd.; anionic surfactant The polymer (A1) had a glass transition temperature of 15° C. and a median diameter D50 of 0.26 μm.

[Production of Electrode Slurry]

The raw materials used in producing the electrode slurry are as follows.

Porous carbon powder: "CNobel (registered trademark) MJ (3) 100-00" manufactured by Toyo Tanso Co., Ltd.; BET specific surface area of 390 $m^2/g$, total pore volume of 0.91 mL/g, micropore volume of 0.15 mL/g, mesopore diameter of 75 nm, bulk density of 0.06 g/mL Electrode binder composition (1): Dispersion of polymer (A1) (electrode binder) produced in Synthesis Example 1 (nonvolatile content: 40% by mass)

Electrode binder composition (2): "KUREHA KF Polymer L #9305" manufactured by Kureha Corporation; 5% by mass solution of PVDF ("KUREHA KF Polymer L #9300": electrode binder) in NMP Electrode binder composition (3): Styrene-butadiene-based rubber (electrode binder) latex (nonvolatile content: 40% by mass)

Electrode binder composition (4): PTFE (electrode binder) aqueous dispersion (nonvolatile content: 60% by mass)

The porous carbon powder, the electrode binder composition, and the addition medium were blended in the formulations shown in Table 2 and kneaded with a rotary and revolutionary stirrer to produce electrode slurries 1 to 9, respectively.

As shown in Table 2, the dispersibility of the porous carbon powder in the obtained electrode slurries was good (○) for electrode slurries 1 to 8, and poor (x) for electrode slurry 9.

[Production of Biofuel Cell]

Electrode slurries 1 to 9 were used to produce biofuel cells, respectively, in the method described below. The biofuel cells obtained by using electrode slurries 1 to 6 are Examples, and the biofuel cells obtained by using electrode slurries 7 to 9 are Comparative Examples.

Details of the ingredients and the raw materials used in the production of the biofuel cells are shown below.

Substrate (Japanese paper): Gasen-shi treated with water repellent finish; Izumo Washi Substrate (oil resistant and water resistant paper): "Oil resistant and water resistant paper (3)" manufactured by LINTEC Corporation Carbon paste: "JELCON CH-8" manufactured by Jujo Chemical Co., Ltd.

AzBTS: 2,2'-azinobis(3-ethylbenzothiazoline-6-sulfonic acid ammonium); manufactured by Tokyo Chemical Industry Co., Ltd.

TTF: Tetrathiafulvalene

GOD: Glucose oxidase; manufactured by FUJIFILM Wako Pure Chemical Corporation

Phosphate buffer: 1 mol/L phosphate buffer, pH 7.0

BOD: Bilirubin oxidase; manufactured by Amano Enzyme Inc.

Triton X-100: Polyethylene glycol-tert-octylphenyl ether; "Triton (registered trademark) X-100"; manufactured by Roche Diagnostics K.K.; nonionic surfactant The carbon paste was screen-printed onto the substrate and dried at 120° C. for 20 minutes to form lead portions. An electrode slurry with 0.04 g of AzBTS added as a mediator was overprinted three times on the lead portions by screen printing, and then dried at 45° C. for 30 minutes to form 32 electrodes having a size of 20 mm×5 mm, and the electrodes were then subjected to UV ozone cleaning for 15 minutes. The electrode pattern was such that four anodes and four cathodes were connected in series and in parallel each.

A saturated methanol solution of TTF was added dropwise as a mediator to the portions of the electrodes corresponding to the anodes, and further, a liquid (10 U/μL) of GOD dispersed in the phosphate buffer was added dropwise at 20 μL per anode.

A liquid (10 U/μL) of BOD dispersed in the phosphate buffer containing Triton X-100 having a concentration of 0.01% by mass was added dropwise to the portions of the electrodes corresponding to the cathodes, at 20 μL per cathode.

After that, the electrodes (patterned electrodes) were dried under reduced pressure for 1 hour to create enzyme electrode plates in which GOD was immobilized on the anodes and BOD was immobilized on the cathodes.

In addition, the phosphate buffer including glucose having a concentration of 0.1 mol/L was added dropwise (1 $mL/cm^2$) to another substrate, and this was dried at 100° C. for 30 minutes to create a glucose-containing substrate.

This glucose-containing substrate was placed on the enzyme electrode of the enzyme electrode plate to produce a biofuel cell.

The enzyme electrode plates each using the Japanese paper as a substrate were created by using electrode slurries 1, 7, and 8, while the enzyme electrode plates each using the oil resistant and water resistant paper were created by using electrode slurries 1 to 6, respectively. Electrode slurry 9 had poor dispersibility, and thus a biofuel cell using this electrode slurry was not produced (Comparative Example 3).

[Output Characteristic Evaluation]

For each of the biofuel cells produced by the above method, the output was measured by linear sweep voltammetry (measurement conditions: two-electrode method, scanning potential open circuit voltage of 0 V, scanning rate of 1 mV/s) to determine the maximum output. The liquid for the measurement was supplied by dropwise addition of the 1 mol/L phosphate buffer (pH 7.0).

The measured maximum output values are shown in Table 2.

TABLE 2

| | Examples | | | | | | Comparative Examples | | |
|---|---|---|---|---|---|---|---|---|---|
| | 1 | 2 | 3 | 4 | 5 | 6 | 1 | 2 | 3 |
| | Electrode slurry | | | | | | | | |
| | 1 | 2 | 3 | 4 | 5 | 6 | 7 | 8 | 9 |
| Porous carbon powder [g] | 5.0 | 4.0 | 4.0 | 3.6 | 2.9 | 2.75 | 5.0 | 5.0 | 5.0 |
| Electrode binder composition [g] | | | | | | | | | |
| (1) | 5.0 | 5.0 | 6.0 | 6.3 | 7.1 | 8.25 | — | — | — |
| (2) | — | — | — | — | — | — | 2.5 | — | — |
| (3) | — | — | — | — | — | — | — | 2.0 | — |
| (4) | — | — | — | — | — | — | — | — | 2.0 |
| Electrode binder content [g] | 2.0 | 2.0 | 2.4 | 2.5 | 2.8 | 3.3 | 2.5 | 2.0 | 2.0 |
| [parts by mass] (vs. 100 parts by mass per porous carbon powder) | 40 | 50 | 60 | 70 | 100 | 120 | 50 | 40 | 40 |
| Addition medium [g] | | | | | | | | | |
| Ion exchanged water | 38.3 | 39.5 | 39.5 | 35.6 | 26.5 | 27.8 | — | 56.7 | 58.3 |
| NMP | — | — | — | — | — | — | 18 | — | — |
| Electrode slurry dispersibility | ○ | ○ | ○ | ○ | ○ | ○ | ○ | ○ | x |
| Maximum output [$\mu W/cm^2$] | | | | | | | | | |
| Substrate (Japanese paper) | 673 | — | — | — | — | — | 180 | 61 | — |
| Substrate (oil resistant and water resistant paper) | 139 | 182 | 142 | 114 | 110 | 112 | — | — | — |

As shown in Table 2, it was found that the biofuel cell produced by using electrode slurry 1 exhibits good output characteristics (Example 1). In addition, it can be deemed that the biofuel cells produced by using electrode slurries 2 to 6, also exhibit good output characteristics (Examples 2 to 6). On the other hand, the biofuel cells produced by using electrode slurries 7 and 8, respectively, had poor output characteristics (Comparative Examples 1 and 2).

From the above, it can be deemed that the biofuel cell produced by using an electrode slurry including the aqueous electrode binder according to the present embodiment exhibits its good output characteristics.

REFERENCE SIGNS LIST

1 Substrate
2 Anode
3 Cathode
4 Lead portion
5 Cover sheet
6 Skin
10, 20 Biofuel cell

The invention claimed is:

1. An electrode binder for a biofuel cell, comprising a polymer (A) comprising a first structural unit obtained from a nonionic ethylenically unsaturated monomer (a1), a second structural unit obtained from an anionic ethylenically unsaturated monomer (a2), and a third structural unit obtained from a crosslinking agent (a3), wherein the crosslinking agent (a3) has two or more ethylenically unsaturated bonds in one molecule, the anionic ethylenically unsaturated monomer (a2) comprises both (i) one or more selected from the group consisting of ethylenically unsaturated carboxylic acids and salts thereof and (ii) one or more selected from the group consisting of ethylenically unsaturated sulfonic acids and salts thereof, the nonionic ethylenically unsaturated monomer (a1) comprises an aromatic ethylenically unsaturated compound, a (meth)acrylic acid alkyl ester, and a polar group-containing ethylenically unsaturated carboxylic acid ester, wherein the aromatic ethylenically unsaturated compound comprises styrene, the (meth)acrylic acid alkyl ester comprises (meth)acrylic acid-2-ethylhexyl, and the polar group-containing ethylenically unsaturated carboxylic acid ester comprises (meth) acrylic acid-2-hydroxyethyl, and a content of the second structural unit in the total amount of the first structural unit, the second structural unit, and the third structural unit that constitute the polymer (A) is 20% by mass or less.

2. The electrode binder for a biofuel cell according to claim 1, wherein a content of the second structural unit in the total amount of the first structural unit, the second structural unit, and the third structural unit that constitute the polymer (A) is 1.5 to 20% by mass.

3. The electrode binder for a biofuel cell according to claim 1, wherein a content of the first structural unit in the total amount of the first structural unit, the second structural unit, and the third structural unit that constitute the polymer (A) is 60 to 98% by mass.

4. The electrode binder for a biofuel cell according to claim 1, wherein the polymer (A) consists of the first structural unit obtained from the nonionic ethylenically unsaturated monomer (a1), the second structural unit obtained from the anionic ethylenically unsaturated monomer (a2), and the third structural unit obtained from the crosslinking agent (a3).

* * * * *